(12) United States Patent
Grimley

(10) Patent No.: US 9,273,377 B2
(45) Date of Patent: Mar. 1, 2016

(54) METHOD OF METALS RECOVERY FROM REFINERY RESIDUES

(75) Inventor: Matthew Stephen Grimley, Lincolnshire (GB)

(73) Assignee: Intevep, S.A., Caracas (VE)

( * ) Notice: Subject to any disclaimer, the term of this patent is extended or adjusted under 35 U.S.C. 154(b) by 9 days.

(21) Appl. No.: 13/582,479

(22) PCT Filed: Mar. 3, 2011

(86) PCT No.: PCT/GB2011/050422
§ 371 (c)(1),
(2), (4) Date: Dec. 11, 2012

(87) PCT Pub. No.: WO2011/107802
PCT Pub. Date: Sep. 9, 2011

(65) Prior Publication Data
US 2013/0078167 A1 Mar. 28, 2013

(30) Foreign Application Priority Data
Mar. 4, 2010 (GB) .................................. 1003578.0

(51) Int. Cl.
| | | |
|---|---|---|
| C22B 7/00 | (2006.01) | |
| C22B 34/34 | (2006.01) | |
| C22B 3/26 | (2006.01) | |
| C22B 3/12 | (2006.01) | |
| C22B 3/44 | (2006.01) | |
| C22B 23/02 | (2006.01) | |
| C22B 34/22 | (2006.01) | |
| C22B 3/00 | (2006.01) | |

(52) U.S. Cl.
CPC ............. *C22B 34/345* (2013.01); *C22B 3/0005* (2013.01); *C22B 3/12* (2013.01); *C22B 3/44* (2013.01); *C22B 7/008* (2013.01); *C22B 7/009* (2013.01); *C22B 23/026* (2013.01); *C22B 23/0461* (2013.01); *C22B 34/225* (2013.01); *Y02W 30/54* (2015.05)

(58) Field of Classification Search
None
See application file for complete search history.

(56) References Cited

U.S. PATENT DOCUMENTS

| | | |
|---|---|---|
| 3,773,890 A | 11/1973 | Fox et al. |
| 4,145,397 A | 3/1979 | Toida et al. |
| 4,178,227 A | 12/1979 | Metrailer et al. |
| 4,401,573 A | 8/1983 | Perrone et al. |
| 4,514,368 A | 4/1985 | Hubred et al. |

(Continued)

FOREIGN PATENT DOCUMENTS

| | | |
|---|---|---|
| EP | 0487368 | 5/1992 |
| EP | 2 113 304 | 11/2009 |

(Continued)

OTHER PUBLICATIONS

International Search Report dated Aug. 23, 2011.

(Continued)

*Primary Examiner* — Steven Bos
(74) *Attorney, Agent, or Firm* — Bachman & LaPointe, PC

(57) ABSTRACT

A method of recovering vanadium, nickel and molybdenum from heavy crude oil refinery residues comprises pyrolysis and combustion of the residues at temperatures up to 900° C. to produce an ash, converting the ash to an aqueous slurry comprising sodium hydroxide as leading agent and hydrogen peroxide as oxidizer, and extracting vanadium, nickel and molybdenum salts and oxides from the slurry. Extraction processes for the metals are disclosed.

22 Claims, 3 Drawing Sheets

(56) References Cited

U.S. PATENT DOCUMENTS

| | | | |
|---|---|---|---|
| 4,557,821 A | 12/1985 | Lopez et al. | |
| 4,596,785 A | 6/1986 | Toulhoat et al. | |
| 4,668,483 A | 5/1987 | Ladd et al. | |
| 4,710,486 A | 12/1987 | Lopez et al. | |
| 4,941,966 A | 7/1990 | Merz et al. | |
| 4,969,988 A | 11/1990 | Jain et al. | |
| 5,124,024 A | 6/1992 | Krzywicki et al. | |
| 6,511,937 B1 | 1/2003 | Bearden et al. | |
| 7,807,044 B2 | 10/2010 | Roy-Auberger et al. | |
| 7,935,244 B2 | 5/2011 | Roy-Auberger et al. | |
| 8,048,292 B2 | 11/2011 | Powers et al. | |
| 8,298,982 B2 | 10/2012 | Pereira-Almao et al. | |
| 8,435,400 B2 | 5/2013 | Kou et al. | |
| 8,551,907 B2 | 10/2013 | Pereira et al. | |
| 2003/0102250 A1 | 6/2003 | Siskin et al. | |
| 2006/0054534 A1 | 3/2006 | Chen et al. | |
| 2006/0272982 A1 | 12/2006 | Montanari et al. | |
| 2008/0156700 A1 | 7/2008 | Abulnaga et al. | |
| 2009/0008290 A1 | 1/2009 | Biswas et al. | |
| 2009/0163352 A1 | 6/2009 | Powers et al. | |
| 2009/0283447 A1 | 11/2009 | D'Elia et al. | |
| 2010/0163459 A1 | 7/2010 | Odueyungbo | |
| 2011/0017638 A1 | 1/2011 | Farshid et al. | |
| 2011/0176978 A1 | 7/2011 | Canelon et al. | |

FOREIGN PATENT DOCUMENTS

| | | |
|---|---|---|
| EP | 2 325 285 | 5/2011 |
| EP | 2 348 136 | 7/2011 |
| GB | 2456537 | 7/2009 |
| RU | 1836408 C | 8/1993 |
| RU | 2270230 | 2/2006 |
| RU | 2412022 | 2/2011 |
| WO | 2006/031570 | 3/2006 |
| WO | 2007/059621 | 5/2007 |
| WO | 2009070778 | 6/2009 |
| WO | 2009070778 A2 | 6/2009 |
| WO | 2010033487 | 3/2010 |

OTHER PUBLICATIONS

Chinese Patent Apln. No. 201010219239.X office action issued Jul. 22, 2014.
Canadian Office action dated Nov. 4, 2013.
Canadian Office action dated Nov. 6, 2013.
Chinese patent apln No. 201180018759.7 dated Sep. 12, 2014.
Chinese patent apln. No. 201180018754.4 dated Sep. 12, 2014.
Mexican Patent Apln. No. MX/a/2012/010208 office action issued Jul. 17, 2014.
European Patent Application No. 08017357.8 office action dated Feb. 11, 2014.
Chinese Office action for Application No. 201180018759.7 dated Dec. 29, 2014.
Russian Decision to Grant for Application No. 2012148118 dated Feb. 3, 2015.
Chinese Office action for Application No. 201180018754.4 dated Dec. 22, 2014.
Russian Office action for Application No. 2012148117 dated Dec. 23, 2014.
Russian Office action for Application No. 2012148119 dated Dec. 23, 2014.
Russian Office Action for Russian Application No. 2012148119 dated Apr. 2, 2015.
Ellis & Paul, Tutorial: Delayed Coking Fundamentals, Great Lakes Carbon Corporation, Mar. 8-12, 1998.
Russian Decision to Grant for Application No. 2012148119 dated Jul. 16, 2015.

METHOD OF METALS RECOVERY FROM REFINERY RESIDUES

FIELD OF THE INVENTION

This invention is directed to a method for recovering metals from refinery residues such as, for example, residues generated through the application of novel catalytic slurry type technologies for deep hydrocracking of heavy vacuum residue.

BACKGROUND TO THE INVENTION

The average quality of crude oil produced worldwide is becoming heavier (higher density/more carbon rich) and sourer (higher in sulphur) as the light sweet crude oil fields are depleting. Heavy-sour crudes contain high concentrations of metals such as vanadium and nickel. The concentration of metals in crude oil can vary from a few ppm up to 1,000 ppm; the vanadium to nickel ratio is typically 6:1.

Deep conversion processes (e.g. coking, flexicoking, visbreaking, gasification etc.) and sulphur removal processes are required to break down the heavy products into lighter products. The heavier and sourer the crude oil, the more extensive and expensive the cracking and sulphur removal processes become.

The metal content of oil refinery residues is an increasing environmental concern. Vanadium is a known mutagen, and nickel a known carcinogen; the release of these metals to the environment is becoming increasingly tightly monitored and controlled by Environment Agencies worldwide.

Existing disposal routes for refinery residues with high sulphur and metals contents are under increasing pressure as the environmental liability for removal of metals from the processing of the waste streams, e.g. from flue gases following power generation, make the processing unviable. Other disposal routes such as landfill are also becoming more limited in availability and increasingly costly.

Catalysts have been used widely in the refining and chemical processing industries for many years. Hydroprocessing catalysts, including hydrotreating and hydrocracking catalysts, are now widely employed in facilities worldwide. These hydroprocessing catalysts typically produce increased yields, faster reaction times, and improved product properties when compared with pri- or (non-catalytic) thermal processes for converting crude oils into refined products.

Hydroprocessing catalysts typically employed in commercial application today are classified as "supported" catalysts. These catalyst supports, which are generally molecular sieves such as SAPO's or zeolites, are often composed of materials such as silica, alumina, zirconia, clay, or some hybrid of these. A more expensive material, which imparts much of the actual catalytic activity, is impregnated on the support. These catalytic materials typically include metals such as nickel, molybdenum, and cobalt. In some cases platinum, palladium, and tungsten may be used.

Recently, a new generation of hydroprocessing catalysts has emerged. These catalysts do not require a support material. The catalyst is instead comprised of unsupported, micron-sited catalyst particles, such as molybdenum sulphide or nickel sulphide. These catalysts, due to factors such as increased surface area and other factors not discussed here, are many times more active than traditional supported catalysts. Performance is greatly improved during conversion operations when compared to traditional supported catalysts. One area in which these highly active, unsupported catalysts are currently being employed is vacuum residue hydrocracking. In the process of being utilized in residue hydrocracking service, these unsupported catalysts often suffer a high amount of metals (specifically vanadium) and coke deposition, which increases the need for fresh makeup catalyst.

One drawback to both supported and unsupported catalysts is their cost. Typically, replacement costs for an expensive noble metal catalyst may be a major operating expenditure item in a refinery or chemical plant. A market has thus emerged to reclaim spent catalysts, and specifically spent hydroprocessing catalysts, so that the valuable metals can be recycled. The current high price of various metals has driven this need even further. Several spent catalyst reclaimers are currently in business at various locations around the world. Unfortunately, however, these roasting (or pyrometallurgical) based reclaimers are designed to recover metals from supported catalysts.

Due to the high concentrations of metals, specifically molybdenum and nickel, used in this new generation of unsupported catalysts, a need has been identified for an economical unsupported catalyst metals recovery process. We have developed a novel process to recover these metals from this class of highly active, unsupported, catalysts, which are composed primarily of $MoS_2$ or NiS. This process allows recovery of both the catalytic metals, including molybdenum and nickel, as well as the deposited metals, such as vanadium and nickel.

Means for recovery of vanadium, nickel and molybdenum from catalysts has been disclosed in other patents. For example, U.S. Pat. No. 4,762,812 discloses a process for the recovery of a spent supported catalyst comprising molybdenum sulphide from a hydroprocess for the upgrading of a hydrocarbonaceous mineral oil containing nickel and vanadium. The catalyst is further treated to remove molybdenum. The process preferentially recovers molybdenum, while leaving much of the vanadium in the catalyst.

U.S. Pat. No. 4,544,533 discloses a method for recovering metals from spent supported hydroprocessing catalyst. Metals recovered may be those obtained from crude oils, including iron, nickel, vanadium and tungsten as well as catalytic metals such as molybdenum, cobalt, or nickel. The catalyst is roasted to remove carbonaceous and sulphurous residues then metals are leached simultaneously from spent catalyst.

U.S. Pat. No. 4,514,369 discloses leaching spent supported catalysts, to obtain a liquor containing cobalt, nickel, molybdenum and vanadium. The metals are extracted, isolated and purified by liquid/liquid extraction techniques.

U.S. Pat. No. 4,432,949 discloses leaching metals from a catalytic support which had been previously roasted. Vanadium is removed by precipitation, and nickel, cobalt and molybdenum are then removed by serial ion exchange.

SUMMARY OF THE INVENTION

According to the invention, there is provided a method of recovering vanadium, nickel and molybdenum from heavy oil refinery residues, comprising pyrolysis and combustion of the residues at temperatures up to 900° C. to produce an ash, converting the ash to an aqueous slurry, and extracting vanadium, nickel and molybdenum compounds, suitably salts and oxides from the slurry.

Other features of the invention are set out in Claims 2 to 24.

DETAILED DESCRIPTION OF THE ILLUSTRATED EMBODIMENT

The process of the invention enables the recovery of metals, specifically vanadium, molybdenum and nickel from spent unsupported hydroprocessing catalysts. The process comprises the steps of metals leach with sodium hydroxide and hydrogen peroxide, recovery of vanadium and molybdenum salts by precipitation with ammonium sulphate, and nickel hydroxide recovery through further leaching, and precipitation with magnesium oxide.

Figure 1A:
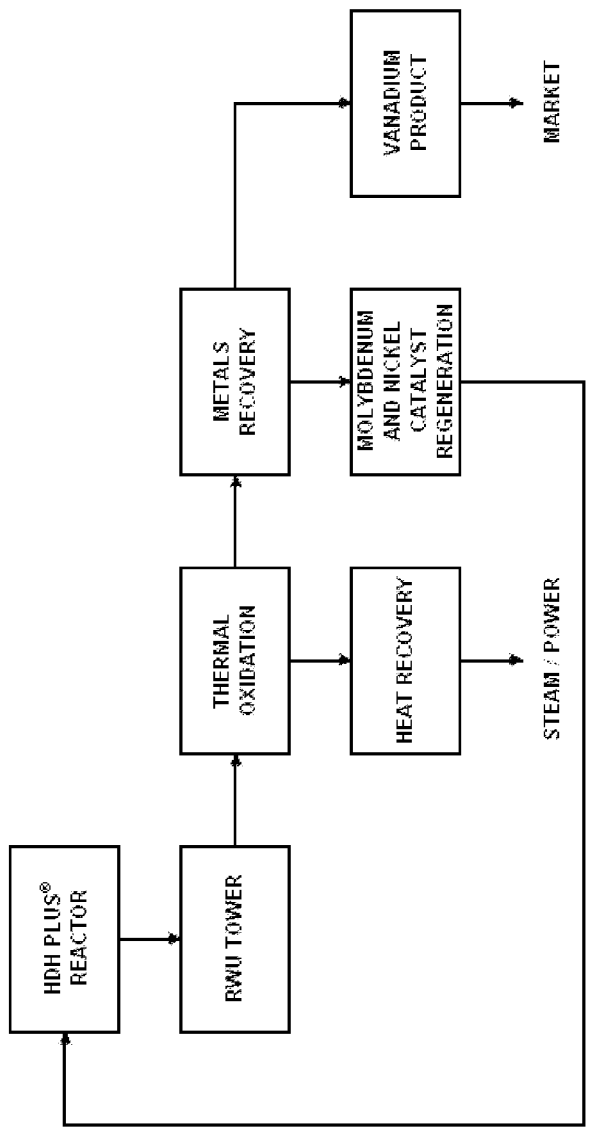
FIG. 1a provides a broad overview of the process of the invention.

FIG. 1a shows a brief overview of the process of the present invention. The refinery process residue is fed directly from the refinery process to a thermal oxidation process. The thermal oxidation process removes any residual organics and increases the concentration of metals in the resulting ash by burning off a proportion of the carbon. Steam can be recovered from the thermal oxidation process.

The thermal oxidation process generates a suitable feed for metals recovery. It is preferable to have the highest possible concentration of metals in the feed to the metals recovery plant. The concentration of metals in the feed will have an impact on the scale of the process equipment required for the metals recovery plant. The lower the concentration, the larger the front end processing equipment and higher the capital cost.

Figure 1B:
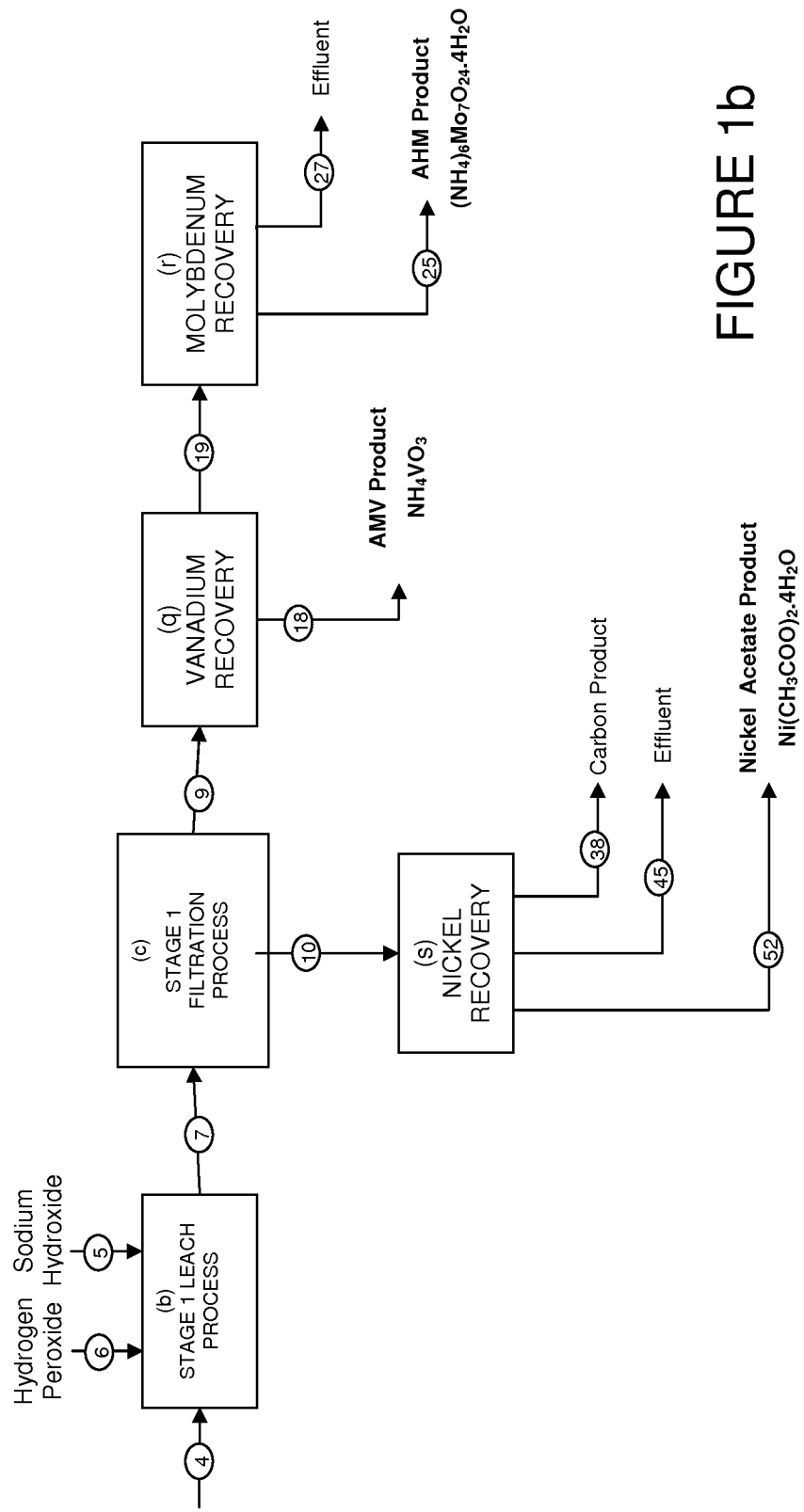
FIG. 1b provides a view of the extraction parts of the process.

The ash from the thermal oxidation process is fed to a mixing tank where it is mixed with water to form a slurry. The slurry is then pumped to a leaching system (b) (FIG. 1b) where the vanadium and molybdenum are leached into solution using an alkaline solution of sodium hydroxide. An oxidising environment is maintained by the addition of hydrogen peroxide. The molybdenum and vanadium are leached as soluble sodium salts.

The slurry is then filtered in a filtration process (c) and the supernatant passed to a series of precipitation tanks (q) and (r) for selective precipitation of the vanadium and molybdenum as solid ammonium salts ammonium metavanadate (AMV) and ammonium tetramolybdate (ATM).

The ATM is converted to ammonium heptamolybdate (AHM) for reuse as a catalyst in the upstream processes.

The AMV is converted into vanadium pentoxide by roasting at low temperature. Roasting breaks down the ammonium salt into ammonia and V2O5. The ammonia is recovered in a sulphuric acid scrubber and reused in the precipitation processes.

The insoluble solids recovered from the first filtration stage (c) are passed to a second leaching system (s) where the nickel is leached into solution using sulphuric acid.

The slurry, a mixture of insoluble carbonaceous material and soluble nickel sulphate, is then filtered and the supernatant passed to a precipitation system for precipitation of the nickel as solid nickel hydroxide. The nickel hydroxide is then dissolved in an acetic acid solution to form a concentrated solution of nickel acetate. The concentrated nickel acetate solution is passed to a crystallisation unit for recovery of solid nickel acetate crystals for reuse in the upstream process.

Solids recovered from the second leach stage will be a de-metallised, non-toxic, non-hazardous, mixture of ashes and any residual carbon.

Process effluents will, where practicable, be reused in the process. Other effluents will be treated on-site to eliminate any negative environmental impact prior to disposal.

Both vanadium and molybdenum are removed in the instant invention using precipitation techniques. A high solid/liquid ratio in the leaching stage is used to obtain high concentrations of metals in the resulting supernatant. This allows for direct precipitation without the use of extraction by expensive organic solvents.

Feed Treatment Prior to Metals Extraction

The process uses a sequence of hydrometallurgical processes to recover molybdenum, vanadium and nickel from the residues of catalytic hydrocracking of heavy oil VR residues, leaving a residual carbon product which is low in metals. The vanadium is recovered as ammonium metavanadate (AMV), the molybdenum as ammonium heptamolybdate tetrahydrate (AHM) and the nickel as nickel acetate tetrahydrate.

Prior to any metals recovery process it is necessary to convert the heavy oil refinery residues product into a form from which the metals can be recovered. For this purpose, the heavy oil deep conversion process residue was subjected to a series of trials to identify suitable regimes to concentrate the Mo, Ni and V. These trials were conducted to track the sublimation of the metals under a range of thermal treatments at temperatures ranging from 500° C. to 1250° C.

Conventional art expects Mo to begin to sublimate at temperatures <900° C. but pilot trials have shown this not to be the case in this instance. Tests have shown no losses of metals under thermal oxidation at up to 900° C.

Other pre-treatment processes exist but are not discussed here. Thermal oxidation was selected based on a combination of capital cost and technical security. The thermal oxidation process itself comprises of two stages, the pyrolysis of the heavy oil deep conversion process residues to remove the tars, followed by the combustion of the residual char to concentrate the metals in the resulting ashes. The combustion of the char can be carried out at low temperatures (500° C.) for long periods of time (e.g. 20 hours) or shorter periods of time at higher temperatures (600-900° C., >1 hour). This thermal oxidation will burn off any residual organics and (the majority) of the carbon without causing the metals to volatilise, and will produce a free flowing ash as feed to the metal extraction process.

Using thermal oxidation is a novel and attractive process in this case because it provides a simple low technical risk solution with low development costs. This option produces a significant amount of heat which can be recovered in a waste heat boiler to produce steam. Possible variations involve power production from produced steam.

It is anticipated that this thermal oxidation option will require flue gas clean up in the form of desulphurisation and possibly $NO_x$ removal to reach internationally accepted emissions limits.

Vanadium and Molybdenum Leaching

Figure 2:
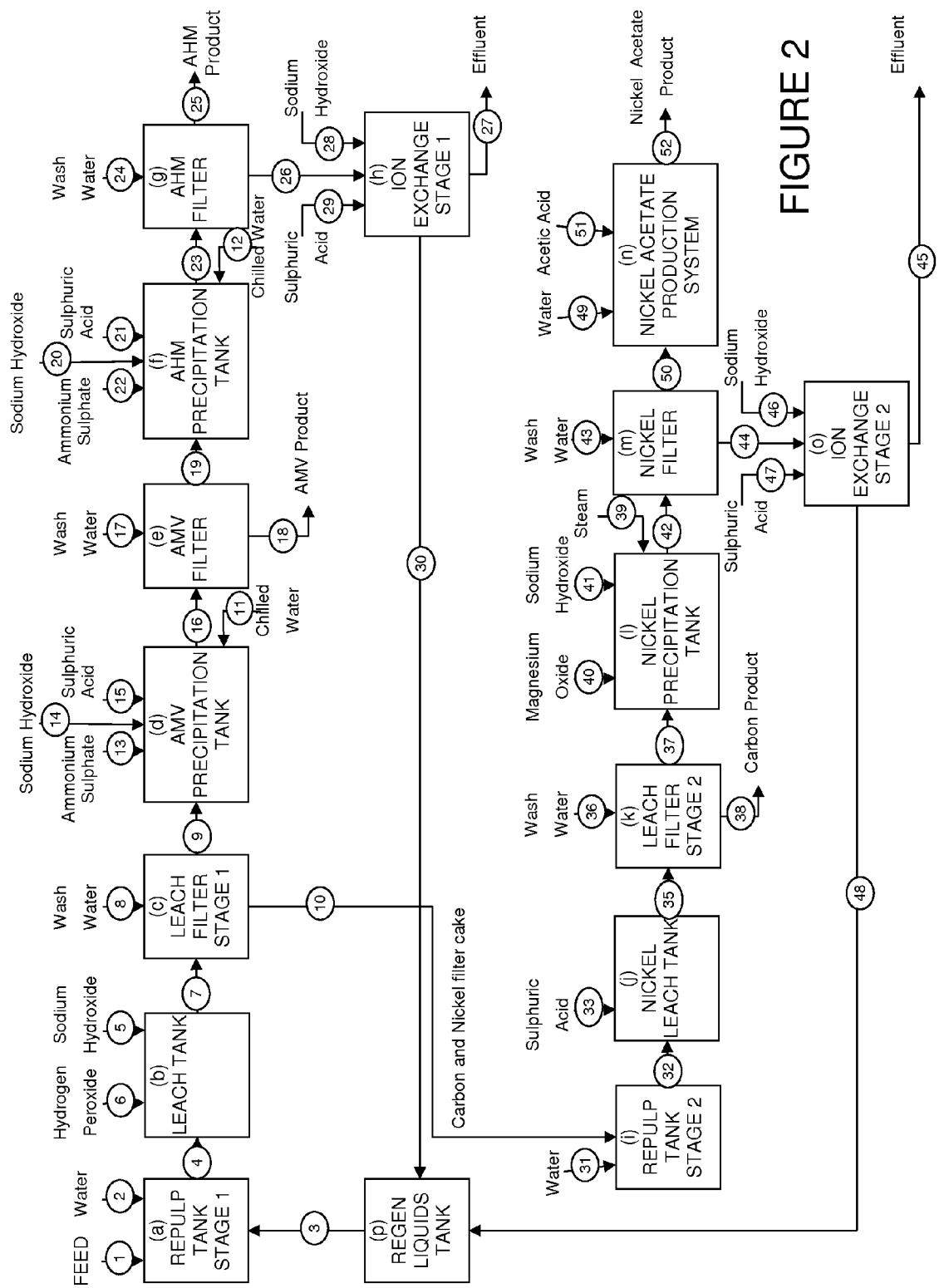
FIG. 2 describes the process in more detail

Referring to FIG. 2, the feed (line 1) is fed to the repulp tank stage 1 (a) to produce a slurry by using fresh water (line 2, water to feed ratio=2:1) and mixing with regenerated liquids (line 3, from the regen liquids storage tank (p).

The slurried feed is transferred to the leach tank (b) where the vanadium and molybdenum are leached into solution using 50% wt sodium hydroxide (line 5) in the leach tank, with 120% excess of sodium hydroxide. It is necessary to ensure that the vanadium and molybdenum are maintained at their highest oxidation states and so hydrogen peroxide (50% wt) is added (line 6). The quantity of hydrogen peroxide required will be determined on a case by case basis depending on the characterisation of the specific feed material.

The leach process reacts vanadium and molybdenum ions with sodium hydroxide to form soluble sodium metavanadate and sodium molybdate. The nickel will remain in an insoluble form. The yield of vanadium and molybdenum into solution will be >95%. The reactions between sodium hydroxide, vanadium pentoxide and molybdenum oxide to produce soluble sodium salts are shown below:

$$2NaOH+V_2O_5 \rightarrow 2NaVO_3+H_2O$$

$$MoO_3+2NaOH \rightarrow Na_2MoO_4+2H_2O$$

These reactions occur at various temperatures, preferably in the range from 50° C. through about 90° C., most preferably in the range 60° C. through about 70° C. Leaching occurs in alkaline conditions with a pH range from 7 through about 13, most preferably from about 8 through 8.5.

The leach process slurry (line 7) is passed to the leach filter stage 1 (*c*) to separate the metals rich supernatant from the insoluble solids. Wash water (line 8) is fed to leach filter stage 1 (*c*) in a ratio of 1:1 to dry solids (carbon, ashes and nickel) to remove entrained metals from the filter cake. Both the solids and the wash water are transferred via line 10 to the repulp tank stage 2 (*i*) in the nickel extraction section. The supernatant (line 9, rich in vanadium and molybdenum) will be pumped to the AMV precipitation tank (d).

Vanadium Precipitation

The vanadium is precipitated as AMV by adjusting the pH to 7.9-8.2, by heating to 50° C. and by adding ammonium ions. The ammonium ions are introduced by adding solid ammonium sulphate crystals (line 13) in 10% excess to ensure that the maximum proportion of the vanadium is precipitated. Once the precipitation conditions are met, and the ammonium sulphate added, the process liquids are cooling with chilled water from to 10° C. This cooling increases yields and dramatically reduces residence time. The precipitation reaction is shown below:

$$2NaVO_3+(NH_4)_2SO_4 \rightarrow 2NH_4VO_3+Na_2SO_4$$

This reaction occurs at various temperatures, but preferably in the range from 50° C. through 5° C., more preferably in the range from about 20° C. through about 5° C., and most preferably in the range from about 10° C. through about 5° C. Process pH values range from about 8.5 through about 7.3, more preferably from about 8.2 through about 7.5, and most preferably at 7.9.

On completion of the precipitation reaction, the solid AMV in line 16 is recovered in the AMV filter (e). The AMV product is washed with cold clean water (line 17) in a 1:1 wt/wt ratio to the collected solids to remove entrained filtrate from the cake. Line 18 consists of the AMV product and filter washings. The supernatant (line 19, rich in molybdenum) is transferred to the ammonium heptamolybdate tetrahydrate (AHM) precipitation tank (f)

Molybdenum Precipitation

Referring to FIG. 2, when molybdenum trioxide ($MoO_3$) is dissolved in an alkali solution (50% wt sodium hydroxide, line 20) the $MoO_4^{2-}$ anion is produced. As the pH is reduced with 50% wt sulphuric acid (line 21) to <4, the heptamolybdate ($Mo_7O_{24}^{6-}$) is formed. The molybdenum can then be precipitated as ammonium heptamolybdate tetrahydrate (AHM) by the addition of ammonium ions in the form of solid ammonium sulphate (line 22). A 10% excess is required to ensure that the maximum proportion of the molybdenum is precipitated. This precipitation process is temperature dependent. Cooling with chilled water (line 12) from 30° C. to 10° C. will increase yields and reduce residence time. The precipitation reactions are shown below:

$$MoO_3 + 2NaOH \longrightarrow Na_2MoO_4 + H_2O$$

$$7Na_2MoO_4 + 4H_2SO_4 \longrightarrow Na_6Mo_7O_{24} \cdot 4H_2O + 4Na_2SO_4$$

$$Na_6Mo_7O_{24} \cdot 4H_2O + 3(NH_4)_2SO_4 \longrightarrow$$

$$\underline{(NH_4)_6Mo_7O_{24} \cdot 4H_2O + 3Na_2SO_4}$$

$$MoO_3 + 2NaOH + 6Na_2MoO_4 + 4H_2SO_4 + 3(NH_4)_2SO_4 \longrightarrow$$

$$(NH_4)_6Mo_7O_{24} \cdot 4H_2O + 7Na_2SO_4 + H_2O$$

These reactions may occur at various temperatures, preferably in the range from about 50° C. through about 5° C., more preferably in the range from about 20° C. through about 5° C., and most preferably in the range from about 10° C. through about 5° C. Process pH values range from about 5.3 through about 7.1, more preferably from about 6.2 through about 6.7, and most preferably from about 6.3 through about 6.5.

On completion of the precipitation reaction, the solid AHM (line 23) is recovered in the AHM filter (g) by washing it with cold clean water (line 24) in a 1:1 ratio to remove entrained filtrate from the cake. Line 25 consists of the AHM product and filter washings. The supernatant (line 26) is stored in a holding tank and from there transferred to ion exchange unit stage 1 (*h*) for the removal of trace metals. The resulting effluent will contain individual metals concentrations of <2 ppm (line 27).

Nickel Extraction

The carbon and nickel recovered from leach filter stage 1 (*c*) (line 10) are fed to the repulp tank stage 2 (*i*) and mixed with fresh water (line 31) in a solid to liquid ratio of 1:2.

The resulting slurry (line 32) from repulp tank stage 2 (*i*) is transferred to the nickel leach tank (j) where it is leached with 50% wt sulphuric acid (line 33a) in 110% excess to ensure complete reaction, producing nickel sulphate (line 35). The nickel leach process has a yield of >97%:

$$Ni(OH)_2+H_2SO_4 \rightarrow NiSO_4+2H_2O$$

This reaction may occur at various temperatures, preferably in the range from 20° C. through 90° C., more preferably in the range from 50° C. through 80° C., and most preferably in the range from 50° C. through 60° C. Process pH values range from 1.0 through 6.0, more preferably from 2.0 through 5.0, and most preferably from 3.0 through 4.0.

The products of the reaction (line 35) are filtered through the leach filter stage 2 (*k*) to separate the supernatant from the insoluble carbon product. The filter cake is washed (line 36) to clear traces of entrained metals from the carbon in a ratio of 1:1 to the insoluble carbon. The supernatant (line 37), containing a nickel rich solution is transferred to the nickel precipitation tank (l).

Nickel is precipitated from the filtrate as nickel hydroxide by raising the pH with magnesium oxide (line 40) in the nickel precipitation tank (l). The precipitation process is temperature controlled, heating with direct steam injection at 35 psia (line 39) from 30° C. to 60° C. will increase yields and reduce residence time. The precipitation reaction is shown below:

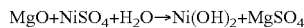

This reaction may occur at various temperatures, preferably in the range from 20° C. through 90° C., more preferably in the range from 50° C. through 80° C., and most preferably in the range from 50° C. through 60° C. Process pH values range from 7.5 through 13.0, more preferably from 7.8 through 9.0, and most preferably from 8.0 through 8.3.

On completion of the precipitation reaction, the solid nickel hydroxide (line 42) is recovered in the nickel filter (m) (line 50). The supernatant (line 44), transferred to ion exchange unit stage 2 (*o*) for removal of trace metals down to <2 ppm.

The nickel hydroxide (line 50) is transferred to the nickel acetate production system tank (n) where it is dissolved in acetic acid (line 49, 1:1 ratio to dry nickel solids) and 100% wt acetic acid (line 51) are added to produce the final product nickel acetate tetrahydrate (line 52). The reaction is shown below:

This reaction occurs at ambient temperature.

The invention claimed is:

1. A method of recovering vanadium, nickel and molybdenum from heavy crude oil refinery residues, comprising pyrolysis and combustion of the residues at temperatures up to 900° C. to produce an ash, forming an aqueous slurry from the ash, and extracting vanadium, nickel and molybdenum compounds from the slurry, comprising recovering nickel in the form of nickel hydroxide by leaching and precipitation with magnesium oxide, and further comprising:

(a) slurrying said ash with water and regenerated liquid from step (p);
(b) treating said slurried ash with an aqueous solvent and an oxidizer in a leaching zone at leaching conditions;
(c) passing the effluent of step (b), which comprises liquid and insoluble solids to a filtration zone, from which solid material is recovered as a filter cake;
(d) passing the supernatant of step (c), which comprises an aqueous phase and an organic phase, to a mixer-settler zone, wherein the supernatant is adjusted for pH and ammonium metavanadate precipitated;
(e) passing the effluent of step (d) to a filtration zone for the removal of ammonium metavanadate solid;
(f) passing the supernatant of step (e) to a mixer-settler zone, wherein the supernatant is adjusted for pH and ammonium heptamolybdate tetrahydrate precipitated;
(g) passing the effluent of step (f) to a filtration zone for the removal of ammonium heptamolybdate tetrahydrate solid;
(h) passing the supernatant of step (g) to an effluent treatment system for removal of traces of metals and ammonium, all of which are recirculated to step (p), prior to disposal through a refinery effluent discharge;
(i) slurrying the filter cake of step (c) with water;
(j) treating said slurried insoluble solids of step (i) with an oxidizing agent in a leaching zone at leaching conditions;
(k) passing the effluent of step (j) to a filtration zone for removal of solid coke contaminants;
(l) passing the supernatant of step (k) to a mixer-settler zone, wherein the solution is neutralised and nickel hydroxide precipitated;

(m) passing the effluent of step (l) to a filtration zone for separation of solid nickel hydroxide;
(n) passing the insoluble solids of step (m), which comprises nickel hydroxide, to a dissolution zone, to which acetic acid is added under dissolution conditions to obtain nickel acetate tetrahydrate as product;
(o) passing the supernatant of step (m) to the effluent treatment system for removal of traces of metals and ammonium, all of which are recirculated to step (p) prior to disposal through the refinery effluent discharge;
(p) recirculating regenerated liquid from step (n) and step (h) to step (a).

2. A method according to claim 1, wherein the combustion step is carried out at a temperature of above 600° C. and up to 900° C.

3. A method according to claim 1, comprising recovery of vanadium and molybdenum by precipitation with ammonium ions.

4. A method according to claim 1, in which the leaching zone in step (b) is a tank with an agitator, the aqueous solvent comprises sodium hydroxide, and the oxidizer comprises hydrogen peroxide.

5. A method according to claim 1, wherein leaching reactions in step (b) occur at a temperature in the range between 60° C. and 67° C., and a pH in the range from 7 to 13.

6. A method according to claim 1, in which the supernatant, rich in vanadium and molybdenum, is separated from the insoluble solids, carbon, nickel, residual vanadium and residual molybdenum filter cake, in the filtration zone of step (c), and wash water is added in a ratio of 1:1 to the filter cake to remove entrained metals.

7. A method according to claim 1, in which the mixer-settler zone in step (d) is a precipitation tank, the supernatant is adjusted for pH with sodium hydroxide and sulphuric acid, and ammonium metavanadate (AMV) precipitated by the addition of ammonium ions from ammonium sulphate.

8. A method according to claim 1, wherein ammonium metavanadate (AMV) precipitation reactions in step (d) occur at a temperature in the range 5° C. to 10° C. and a pH of 7.3 to 8.5.

9. A method according to claim 1, in which the supernatant, rich in molybdenum and with residual molybdenum, is separated from precipitated ammonium metavanadate (AMV) in ammonium metavanadate (AMV) filter step (e), and wash water is added in a ratio of 1:1 to ammonium metavanadate (AMV) cake to remove entrained filtrate.

10. A method according to claim 1, in which the mixer-settler zone in step (f) is a precipitation tank, the supernatant is adjusted for pH with sodium hydroxide and sulphuric acid, and ammonium heptamolybdate (AHM) precipitated by the addition of ammonium ions from ammonium sulphate.

11. A method according to claim 1, wherein ammonium heptamolybdate (AHM) precipitation reactions in step (g) occur at a temperature in the range from 5° C. to 50° C., and a pH in the range from 5.3 to 7.1.

12. A method according to claim 1, in which the supernatant, with residual molybdenum and residual vanadium, is separated from precipitated ammonium heptamolybdate (AHM) in ammonium heptamolybdate (AHM) filter step (g), and wash water is added in a ratio of 1:1 to ammonium heptamolybdate (AHM) cake to remove entrained filtrate.

13. A method according to claim 1, in which the effluent treatment system in step (h) is an ion exchange unit where sodium hydroxide and sulphuric acid are used as regenerators, and effluent limits set at 2 ppm.

14. A method according to claim 1, wherein the filter cake in step (i) comprises carbon, nickel, residual vanadium and residual molybdenum.

15. A method according to claim 1, in which the leaching zone in step (j) is a tank with an agitator and the oxidizing agent comprises sulphuric acid.

16. A method according to claim 1, wherein leaching reactions in step (j) occur at a temperature in the range between 50° C. and 60° C., a pH in the range from 2.0 to 3.0, and an efficiency for nickel >99%.

17. A method according to claim 1, in which the supernatant, rich in nickel sulphate and with residual un-oxidized vanadium and unoxidised molybdenum, is separated from the insoluble carbon product in leach filter step (k), and wash water is added in a ratio of 1:1 to insoluble carbon product to remove entrained filtrate.

18. A method according to claim 1, in which the mixer-settler zone in step (l) is a nickel precipitation tank, the supernatant of step (l), a nickel rich solution, is adjusted for pH with sodium hydroxide, and nickel hydroxide precipitated by the addition of magnesium oxide slurry.

19. A method according to claim 1, wherein nickel hydroxide precipitation reactions in step (l) occur at a temperature in the range from 20° C. to 90° C., and a pH in the range from 7.5 to 13.

20. A method according to claim 1, in which the supernatant, with residual nickel, residual molybdenum and residual vanadium, is separated from the precipitated nickel hydroxide in filter step (m), and wash water is added in a ratio of 1:1 to nickel hydroxide cake to remove entrained filtrate.

21. A method according to claim 1, in which the dissolution zone is a nickel re-slurry tank where water is in a 1:1 ratio to dry nickel solids and acetic acid are added to produce the final product nickel acetate tetrahydrate, at ambient temperature and a pH range between 4.0 and 4.5.

22. A method according to claim 1, in which the effluent treatment system in step (o) is an ion exchange unit where sodium hydroxide and sulphuric acid are used as regenerators, and effluent limits set at 2 ppm.

* * * * *